(12) United States Patent
Armangau et al.

(10) Patent No.: US 12,504,906 B2
(45) Date of Patent: Dec. 23, 2025

(54) SUSTAINABLE STORAGE SYSTEM

(71) Applicant: Dell Products, L.P., Round Rock, TX (US)

(72) Inventors: Philippe Armangau, Kalispell, MT (US); Vasudevan Subramanian, Chapel Hill, NC (US); Ty Schmitt, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/534,473

(22) Filed: Dec. 8, 2023

(65) Prior Publication Data
US 2025/0190134 A1 Jun. 12, 2025

(51) Int. Cl.
*G06F 3/06* (2006.01)

(52) U.S. Cl.
CPC .......... *G06F 3/0652* (2013.01); *G06F 3/0679* (2013.01); *G06F 3/0604* (2013.01)

(58) Field of Classification Search
CPC .... G06F 3/0679; G06F 3/0616; G06F 3/0634; G06F 3/0647; G06F 3/064; G06F 3/0607; G06F 3/0605; G06F 3/0604; G06F 3/0614; G06F 3/0619; G06F 3/0629; G06F 3/0652; G06F 2212/1036; G06F 2212/7208
See application file for complete search history.

(56) References Cited

U.S. PATENT DOCUMENTS

| | | | | |
|---|---|---|---|---|
| 9,608,936 | B1* | 3/2017 | Mehrotra | H04L 67/1097 |
| 2012/0278529 | A1* | 11/2012 | Hars | G06F 12/0246 |
| | | | | 711/E12.008 |
| 2013/0024601 | A1* | 1/2013 | Floman | G06F 11/008 |
| | | | | 711/E12.008 |
| 2016/0011818 | A1* | 1/2016 | Hashimoto | G06F 3/0647 |
| | | | | 711/103 |
| 2019/0043604 | A1* | 2/2019 | Baca | G11C 29/883 |
| 2020/0089424 | A1* | 3/2020 | Klein | G06F 3/0605 |
| 2021/0342242 | A1* | 11/2021 | Ohno | G06F 11/3058 |
| 2022/0365692 | A1* | 11/2022 | Vankamamidi | G06F 3/0689 |
| 2023/0004311 | A1* | 1/2023 | Kobayashi | G06F 21/45 |
| 2023/0120862 | A1* | 4/2023 | Gao | G06F 3/0679 |
| | | | | 711/154 |
| 2023/0367507 | A1* | 11/2023 | Rathore | G06F 3/0679 |
| 2024/0411469 | A1* | 12/2024 | Jain | G06F 3/0673 |

* cited by examiner

*Primary Examiner* — Curtis James Kortman
(74) *Attorney, Agent, or Firm* — Amin, Turocy & Watson, LLP

(57) ABSTRACT

A system can move first data from the first solid state drive to a second solid state drive of a group of solid state drives. The system can unmap the first solid state drive, wherein the unmapping comprises making the first data of the first solid state drive inaccessible via the first solid state drive. The system can convert the first solid state drive from a configuration having a number of cell levels to a pseudo-single-level cell storage configuration, wherein the configuration having the number of cell levels comprises a multiple-level cell storage configuration. The system can re-map the first solid state drive, wherein the re-mapping comprises making the first solid state drive accessible for reads and writes of second data. The system can store the second data to the first solid state drive.

20 Claims, 10 Drawing Sheets

600

(602)

↓

DETERMINING TO CONVERT A FIRST SOLID STATE DRIVE FROM A FIRST CONFIGURATION OF A FIRST NUMBER OF LEVELS PER CELL TO A SECOND CONFIGURATION OF A SECOND NUMBER OF LEVELS PER CELL, WHEREIN THE FIRST NUMBER OF LEVELS PER CELL IS GREATER THAN THE SECOND NUMBER OF LEVELS PER CELL 604

↓

IN RESPONSE TO THE DETERMINING, MOVING DATA FROM THE FIRST SOLID STATE DRIVE TO A SECOND STORAGE DEVICE 606

↓

AFTER MOVING THE DATA FROM THE FIRST SOLID STATE DRIVE TO THE SECOND STORAGE DEVICE, UNMAPPING THE FIRST SOLID STATE DRIVE 608

↓

AFTER UNMAPPING THE FIRST SOLID STATE DRIVE, CONVERTING THE FIRST SOLID STATE DRIVE FROM THE FIRST NUMBER OF LEVELS PER CELL TO THE SECOND NUMBER OF LEVELS PER CELL 610

↓

AFTER CONVERTING THE FIRST SOLID STATE DRIVE, RE-MAPPING THE FIRST SOLID STATE DRIVE 612

DETERMINING THAT A SSD IS OUT OF WARRANTY 804

IN RESPONSE TO DETERMINING THAT A SSD IS OUT OF WARRANTY, CONVERTING THE SSD TO PSLC 806

DETERMINING THAT A USER HAS OPTED-IN TO A SUSTAINABLE STORAGE SYSTEM 904

IN RESPONSE TO DETERMINING THAT THE USER HAS OPTED-IN TO A SUSTAINABLE STORAGE SYSTEM, CONVERTING THE SSD TO PSLC 906

SUSTAINABLE STORAGE SYSTEM

BACKGROUND

Computer systems can store computer data on storage drives.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can determine that a first solid state drive of a group of solid state drives maintained by the system has a wear level that satisfies a defined wear criterion. The system can, in response to the determining, move first data from the first solid state drive to a second solid state drive of the group of solid state drives. The system can, after moving the first data from the first solid state drive to the second solid state drive, unmap the first solid state drive, wherein the unmapping comprises making the first data of the first solid state drive inaccessible via the first solid state drive. The system can, after unmapping the first solid state drive, convert the first solid state drive from a configuration having a number of cell levels to a pseudo-single-level cell storage configuration, wherein the configuration having the number of cell levels comprises a multiple-level cell storage configuration. The system can, after converting the first solid state drive, re-map the first solid state drive, wherein the re-mapping comprises making the first solid state drive accessible for reads and writes of second data. The system can store the second data to the first solid state drive.

An example method can comprise determining, by a system comprising a processor, that a first solid state drive of a group of solid state drives has a wear level that satisfies a specified wear criterion. The method can further comprise, in response to the determining, moving, by the system, data from the first solid state drive to a second solid state drive of the group of solid state drives. The method can further comprise, after moving the data from the first solid state drive to the second solid state drive, trimming, by the system, the first solid state drive. The method can further comprise, after trimming the first solid state drive, converting, by the system, the first solid state drive from a multiple cell level storage configuration to a pseudo-single-level cell storage configuration. The method can further comprise, after converting the first solid state drive, re-mapping, by the system, the first solid state drive.

An example non-transitory computer-readable medium can comprise instructions that, in response to execution, cause a system comprising a processor to perform operations. These operations can comprise determining to convert a first solid state drive from a first configuration of a first number of levels per cell to a second configuration of a second number of levels per cell, wherein the first number of levels per cell is greater than the second number of levels per cell. These operations can further comprise, in response to the determining, moving data from the first solid state drive to a second storage device. These operations can further comprise, after moving the data from the first solid state drive to the second storage device, unmapping the first solid state drive. These operations can further comprise, after unmapping the first solid state drive, converting the first solid state drive from the first number of levels per cell to the second number of levels per cell. These operations can further comprise, after converting the first solid state drive, re-mapping the first solid state drive.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 6 illustrates another example process flow that can facilitate a sustainable storage system, in accordance with an embodiment of this disclosure;

FIG. 8 illustrates another example process flow that can facilitate a sustainable storage system, in accordance with an embodiment of this disclosure;

FIG. 9 illustrates another example process flow that can facilitate a sustainable storage system, in accordance with an embodiment of this disclosure;

DETAILED DESCRIPTION

Overview

Figure 1:
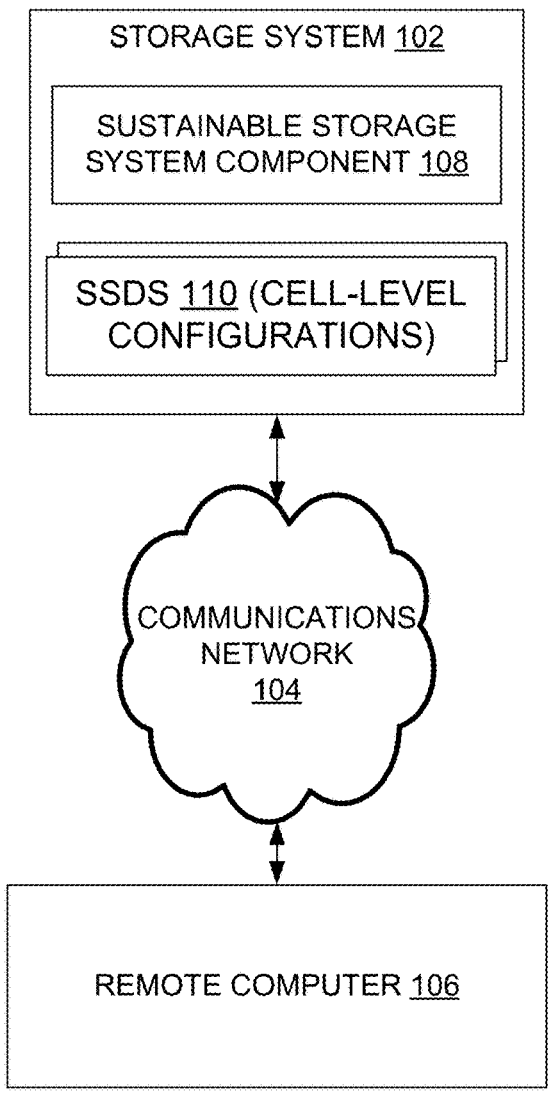
FIG. 1 illustrates an example system architecture that can facilitate a sustainable storage system, in accordance with an embodiment of this disclosure.

A solid state drive (SSD) comprises a type of computer storage that generally comprises integrated circuits (e.g., flash memory) to persistently store data. This can be contrasted with other types of computer storage, such as a hard disk drive that comprises magnetized platters to persistently store data.

SSD technology has experienced trends. There has been an increase in SSD storage capacity, with an increase in a number of possible cell states. Single-level cell (SLC) SSDs store 1 bit/cell. Multi-level cell (MLC) SSDs store 2 bits/cell. Triple-level cell (TLC) SSDs store 3 bits/cell. Quad-level cell (QLC) SSDs store 4 bits/cell. Penta-level cell (PLC) SSDs store 5 bits/cell. Hepta-level cell (HLC) SSDs store 7 bits/cell.

There has been reduced SSD lifespan/wear endurance, over time going from (generally) 10 writes per day (WPD), to 3 WPD, to 0.3 WPD, etc.

There has been reduced SSD write performance.

There has been an increased power consumption in SSDs, as a higher voltage is used to program more states (e.g., 32 states) relative than programming fewer states.

SSD warranties have increased, generally changing in length from 3 years to 5 years.

To improve sustainability, it can be that users want to keep equipment longer, want to re-use or recycle equipment, and want to reduce power consumption in equipment.

The present techniques can be implemented to facilitate the following improvements relative to prior approaches. Substantiality of a storage system leveraging SSD firmware can be facilitated. This can aid in users keeping equipment longer, users re-using or recycling equipment, and power consumption in equipment being reduced. Additionally, the present techniques can be implemented to improve write performance in SSDs relative to prior approaches.

In some examples, the present techniques can be implemented under the following conditions. One condition can be that a SSD's warranty has expired. Another condition can be that a user is willing to extend a lifespan of a SSD at the expense of its capacity. A third condition can be that a wear of the SSD allows for extending its lifetime (e.g., its wear level is >85% but <95%; or its wear level is >85%).

operate. It can be that some SSDs support converting their cell state, and this type of SSDs can be used with the present techniques.

In some examples, an API call can be made to an SSD to determine its wear level or to convert its cell-level configuration. Then, moving data from the SSD can be performed by a file system operation. Adding a drive to a storage pool or removing it from a storage pool can be performed as an operating system operation.

As a result, drive capacity can be reduced, such as to ⅓ of the original capacity (where a TLC state was used) or ¼ of the original capacity (where a QLC state was used).

Also as a result, a lifetime of the SSD can be extended, such as by a factor of 10× for a TLC state (to a pSLC state), or a factor of 20× for a QLC state (to a pSLC state).

After converting the SSD's cell state to pSLC, the SSD can be returned to a pool of reusable devices to be made available for storing new data.

The following table shows example lifetimes for SSDs in four configurations: (a) TLC, (b) TLC after conversion to pSLC, (c) QLC, and (d) QLC after conversion to pSLC. Lifetimes are expressed as remaining program/erase (P/E) cycles for a drive, where a TLC drive is rated for 3,000 P/E cycles per cell, and a QLC drive is rated for 1,000 P/E cycles per drive.

| Wear % | TLC (3,000 P/E) | TLC->pSLC ×10P/E | QLC (1,000 P/E) | QLC->pSLC ×20 P/E |
|---|---|---|---|---|
| 95% Wear | 3,000 * 0.05 = 150 P/E cycles | 150 * 10 = 1,500 P/E | 1,000 * 0.05 = 50 P/E cycles | 50 * 20 = 1,000 P/E Cycles |
| 90% Wear | 3,000 * 0.1 = 300 P/E cycles | 300 * 10 = 3,000 P/E | 1,000 * 0.1 = 100 P/E cycles | 100 * 20 = 2,000 P/E Cycles |
| 85% Wear | 3,000*0.15 = 450 P/E | 450 * 10 = 4,500 P/E cycles | 1,000 * 0.15 = 150 P/E cycles | 150 * 20 = 3,000 P/E cycles |

According to the present techniques, when a selected SSD is past warranty, and has a wear level that is >85% but <95%, the following policy can be applied. A storage system can automatically relocate data out of the SSD to the application, transparently, to other SSDs. In some examples, this can be performed in a manner similar to performing a migration, a transform, or an erasure coding (EC) redundant array of inexpensive disks (RAID) rebuild.

A wear level of an SSD can indicate an average number of program/erase (P/E) cycles that have been performed on the storage cells of the SSD, where a program/erase cycle comprises writing data to a cell of the SSD and erasing data from a cell of an SSD. An SSD can be rated for a particular number of P/E cycles in its lifetime (where this rating can be an estimate rather than an indication of when exactly the drive will fail). A wear level can measure a percentage of an average number of P/E cycles performed on the cells of a SSD compared to the rated P/E cycles for the drive's lifetime.

The selected SSD can be unmapped. Unmapping a drive can generally comprise removing that drive from a redundant array of inexpensive disks (RAID) group, where remapping can be a corresponding action to add that drive back to the RAID group.

The SSD can be converted from its current cell state (e.g., TLC or QLC) into pseudo-SLC (pSLC) using a firmware SSD application programming interface (API). That is, the SSD can be instructed to work on only two states (e.g., Erased or Programmed) like an SSD with a SLC state can An outcome of implementing the present techniques can be improved sustainability and performance of an SSD. Depending on their wear ratio, it can be that pSLC state SSDs can have a longer lifespan than SSDs having other cell states, which can improve sustainability. For example, an energy cost to manufacture a SDD can be higher than that of a hard disk drive (HDD). Increasing a life of a manufactured SSD can help amortize a manufacturing cost of the SSD over a longer period.

Power consumption can be reduced for the SSD where a lower voltage is used to program two cell states compared to more than two cell states.

Then, compared with more than two cell states, write performance can be improved when using two cell states.

Example Architectures

FIG. 1 illustrates an example system architecture 100 that can facilitate a sustainable storage system, in accordance with an embodiment of this disclosure.

System architecture 100 comprises storage system 102, communications network 104, and remote computer 106. In turn, storage system 102 comprises sustainable storage system component 108, and SSDs 110.

Figure 10:
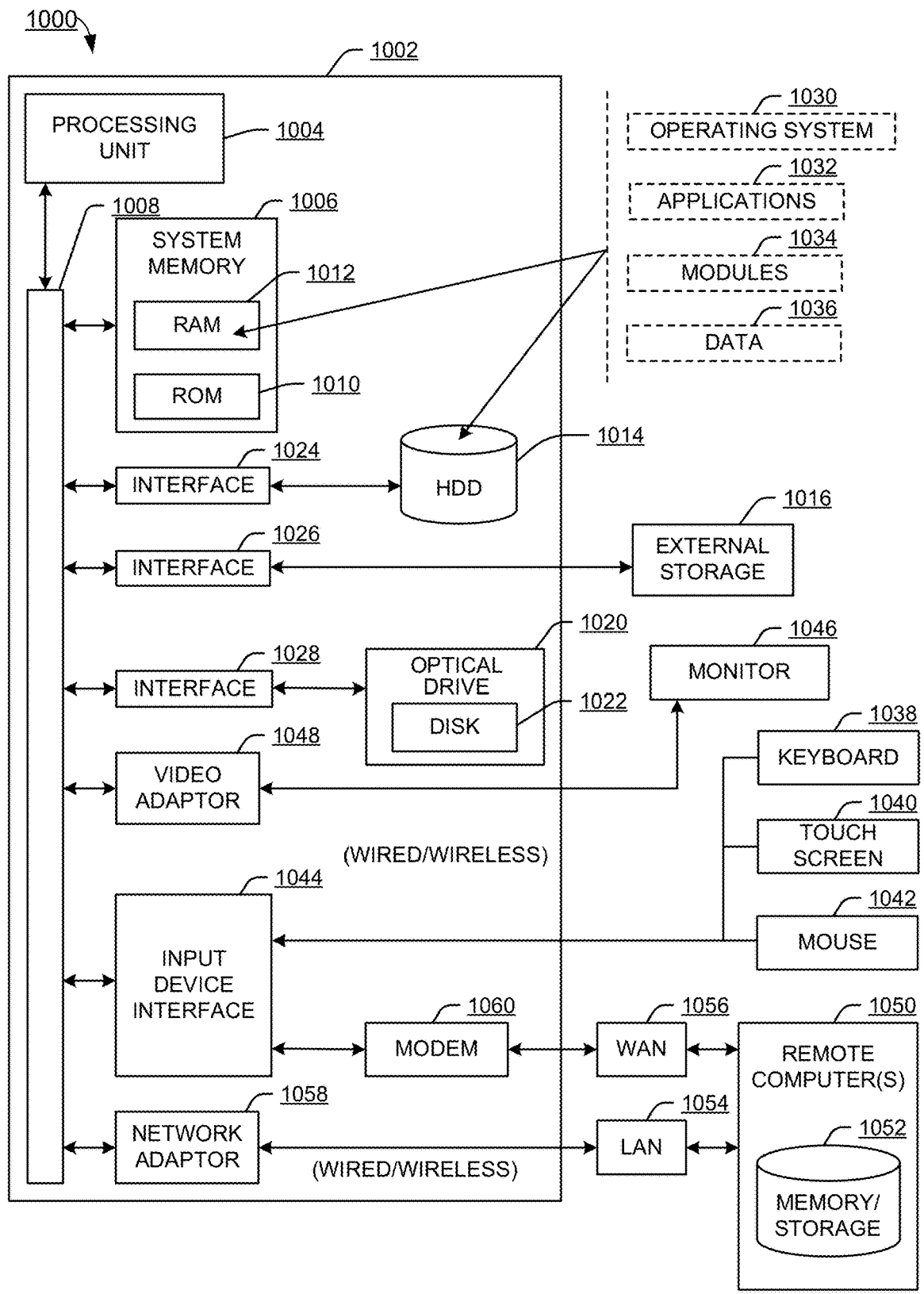
FIG. 10 illustrates an example block diagram of a computer operable to execute an embodiment of this disclosure.

Each of storage system 102 and/or remote computer 106 can be implemented with part(s) of computing environment 1000 of FIG. 10. Communications network 104 can comprise a computer communications network, such as the Internet.

Storage system 102 can comprise multiple SSDs 110 that can be configured to store data, each of which can have its own cell-level configuration (e.g., SLC, TLC, or QLC). Remote computer 106 can read data from and write data to SSDs 110 via communications network 104.

As part of implementing a sustainable storage system, sustainable storage system component 108 can reconfigure the cell-level configuration of a particular SSD of SSDs 110, while maintaining the data of that SSD being stored on storage system 102 (e.g., on a different SSD).

In some examples, sustainable storage system component 108 can implement part(s) of the process flows of FIGS. 4-9 to implement a sustainable storage system.

It can be appreciated that system architecture 100 is one example system architecture for sustainable storage system, and that there can be other system architectures that facilitate a sustainable storage system.

Figure 2:
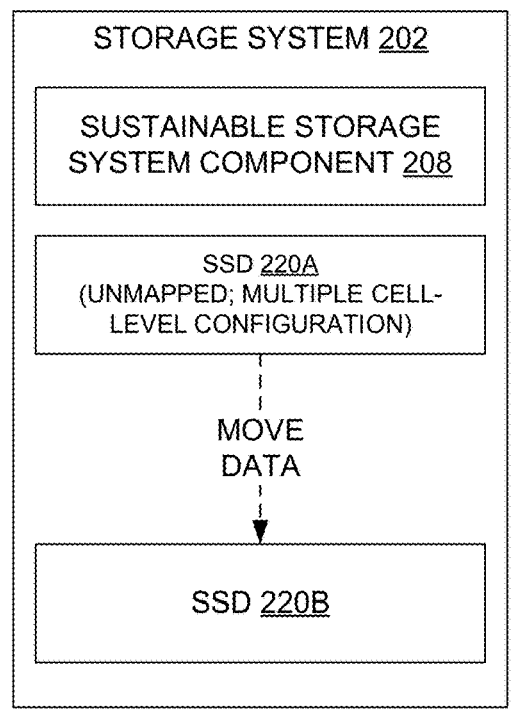
FIG. 2 illustrates an example system architecture at a first point in time that can facilitate a sustainable storage system, in accordance with an embodiment of this disclosure.

FIG. 2 illustrates an example system architecture 200 at a first point in time that can facilitate a sustainable storage system, in accordance with an embodiment of this disclosure. In some examples, part(s) of system architecture 200 can be implemented by part(s) of system architecture 100 of FIG. 1 to facilitate a sustainable storage system.

System architecture 200 comprises storage system 202 (which can be similar to storage system 102 of FIG. 1), sustainable storage system component 208 (which can be similar to sustainable storage system component 108), and SSD 210A and SSD 210B (which can each be similar to an SSD of SSDs 110).

Figure 3:
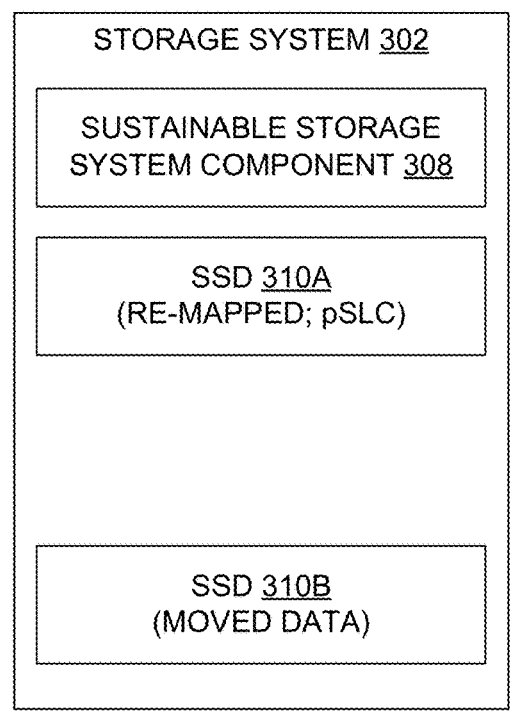
FIG. 3 illustrates an example system architecture at a second point in time that can facilitate a sustainable storage system, in accordance with an embodiment of this disclosure.

FIG. 2 and FIG. 3 can depict a storage system at different points in time. Generally, in FIG. 2, a reconfiguration of a cell-level configuration of SSD 210A is in progress, and in FIG. 3, the reconfiguration has been completed.

In system architecture 200, SSD 210A has a multiple cell-level configuration (e.g., TLC or QLC) and is in the process of being reconfigured to a pSLC configuration. SSD 210A has been unmapped, and its data is being moved (sometimes referred to as being copied) to SSD 210B.

FIG. 3 illustrates an example system architecture 300 at a second point in time that can facilitate a sustainable storage system, in accordance with an embodiment of this disclosure. In some examples, part(s) of system architecture 200 can be implemented by part(s) of system architecture 100 of FIG. 1 to facilitate a sustainable storage system.

System architecture 300 comprises storage system 302 (which can be similar to storage system 202 of FIG. 2), sustainable storage system component 308 (which can be similar to sustainable storage system component 208), SSD 310A (which can be similar to SSD 210A), and SSD 310B (which can be similar to SSD 210B).

FIG. 3 generally depicts the storage system of FIG. 2 at a later point in time. In FIG. 3, the reconfiguration of an SSD has been completed. SSD 310A has been converted from a multiple cell-level configuration (such as the configuration of SSD 210A of FIG. 2), to a pSLC configuration, and has been remapped and is available to store data. The data that was stored in SSD 210A is now stored in SSD 310B.

In this manner, the present techniques can be implemented to facilitate converting an SSD from a multiple cell-level configuration to pSLC while preserving the data stored on the SSD. A reason for doing this can be to extend an expected lifespan of the SSD (such as when the SSD hits a certain wear level and/or is out of warranty).

Example Process Flows

Figure 4:
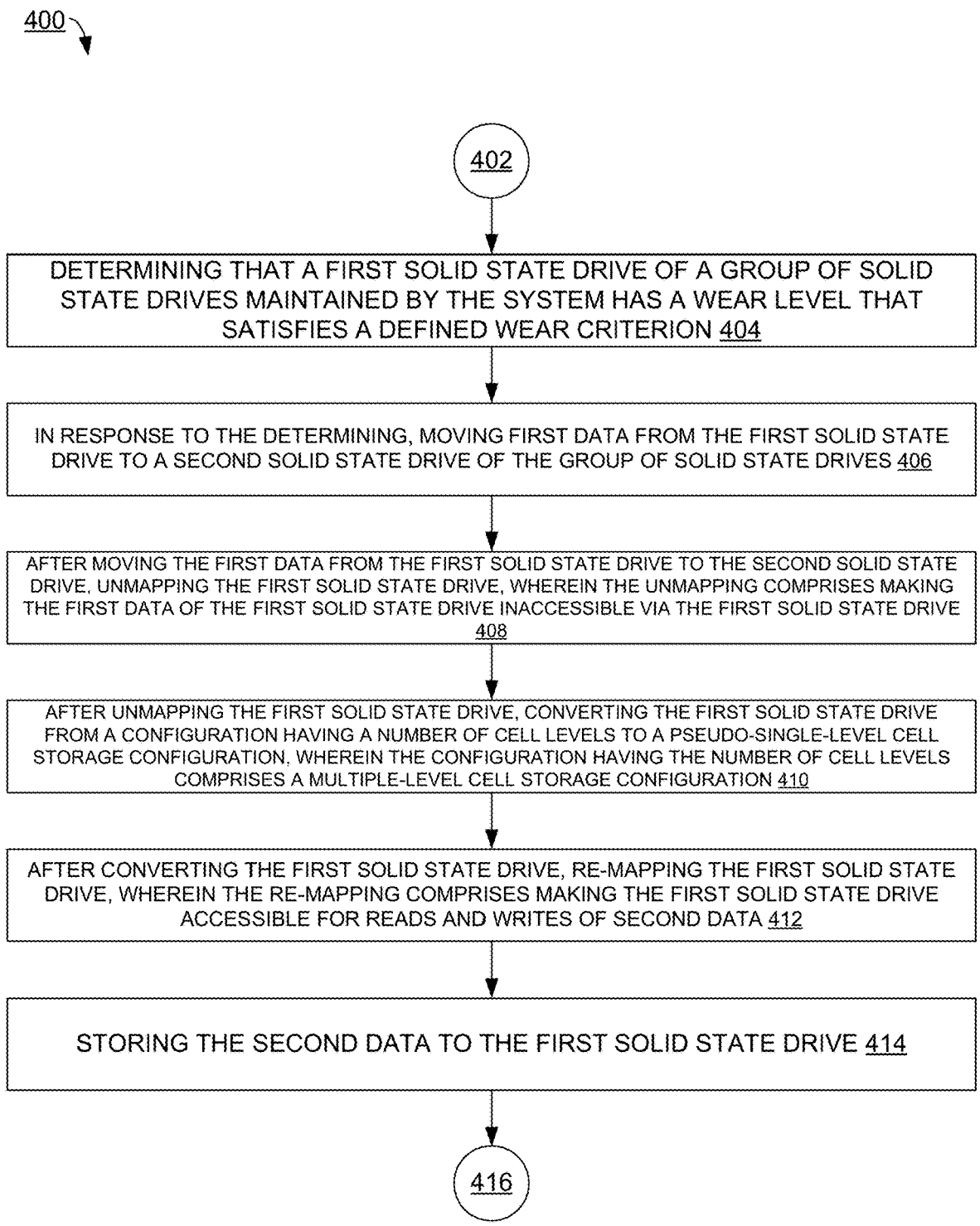
FIG. 4 illustrates an example process flow that can facilitate a sustainable storage system, in accordance with an embodiment of this disclosure.

FIG. 4 illustrates an example process flow 400 that can facilitate a sustainable storage system, in accordance with an embodiment of this disclosure. In some examples, one or more embodiments of process flow 400 can be implemented by sustainable storage system component 108 of FIG. 1, or computing environment 1000 of FIG. 10.

It can be appreciated that the operating procedures of process flow 400 are example operating procedures, and that there can be embodiments that implement more or fewer operating procedures than are depicted, or that implement the depicted operating procedures in a different order than as depicted. In some examples, process flow 400 can be implemented in conjunction with one or more embodiments of one or more of process flow 500 of FIG. 5, process flow 600 of FIG. 6, process flow 700 of FIG. 7, process flow 800 of FIG. 8, and/or process flow 900 of FIG. 9.

Process flow 400 begins with 402, and moves to operation 404.

Operation 404 depicts determining that a first solid state drive of a group of solid state drives maintained by the system has a wear level that satisfies a defined wear criterion. In some examples, the group of solid state drives can be similar to SSDs 110, where the first solid state drive is one drive of SSDs 110.

A wear level can be a measure of an average number of writes per cell made to the drive, relative to a number of writes per cell that the drive is rated for. For example, where an average number of writes per cell made to the drive is 5,000, and a number of writes per cell that the drive is rated for is 10,000, then the wear level can be 50%. And a drive can meet a defined wear criterion where this metric hits a threshold value, such as 85%.

After operation 404, process flow 400 moves to operation 406.

Operation 406 depicts, in response to the determining, moving first data from the first solid state drive to a second solid state drive of the group of solid state drives. Continuing with the example of FIG. 1, the second solid state drive can be one of SSDs 110, and after new writes are halted for the first solid state drive, the data on the first solid state drive can be moved or copied to the second solid state drive.

In some examples, writes are suspended to the first SSD before moving the first data.

In some examples, writes are not suspended to the first SSD, because a suspension would be for too long to be acceptable to a file system layer of a system.

It can be that, for the file system layer, this SSD reconfiguration is seamless and transparent. To effectuate this, a background copy from the first SSD and to another SSD can be initiated. While this background copy occurs, writes to the first SSD can be accepted and mirrored to the other SSD. While this background copy occurs, reads from the first SSD can be allowed.

Such an implementation can facilitate cancelling the reconfiguration, and being seamless to the file system layer.

After operation 406, process flow 400 moves to operation 408.

Operation 408 depicts, after moving the first data from the first solid state drive to the second solid state drive, unmapping the first solid state drive, wherein the unmapping comprises making the first data of the first solid state drive inaccessible via the first solid state drive. Unmapping (or trimming) can be performed to make a drive unavailable (or unviewable) by programs that are configured to read data from and write data to the drive.

When unmapped, a drive can still be mounted so that other operations can be performed on the drive, such as those described in operation 410. First data of the first solid state drive can be inaccessible via the first solid state when the first solid state drive is unmapped, though the first data has been moved to the second solid state drive, and can be accessible via the second solid state drive.

After operation 408, process flow 400 moves to operation 410.

Operation 410 depicts, after unmapping the first solid state drive, converting the first solid state drive from a configuration having a number of cell levels to a pseudo-single-level cell storage configuration, wherein the configuration having the number of cell levels comprises a multiple-level cell storage configuration. This can comprise, for example, converting the drive from a TLC or QLC configuration into a pSLC configuration. In some examples, performing this operation can make the data that was stored on the drive unreadable.

In some examples, converting the first solid state drive from the number of cell levels to the pseudo-single-level cell storage configuration comprises converting via a firmware solid state drive application programming interface call. That is, a conversion to a pSLC format can be performed using a firmware SSD API to instruct the first solid state drive to perform the conversion.

In some examples, the pseudo-single-level cell storage configuration comprises an identification of a cell of the first solid state drive with a Boolean value. In some examples, the Boolean value indicates an erased state or a programmed state. That is, as part of a pSLC configuration, the drive can be instructed to work with only two states, like in a SLC configuration (e.g., Erased, Programmed).

In some examples, the number of cell levels comprises a triple-layer cell configuration, and wherein three bits are written to a cell of the first solid state drive. In some examples, the number of cell levels comprises a quad-layer cell configuration, and wherein four bits are written to a cell of the first solid state drive.

In some examples, the pseudo-single-level cell storage configuration comprises a cell of the first solid state drive that was configured to store multiple bits of data being re-configured to store one bit of data.

After operation 410, process flow 400 moves to operation 412.

Operation 412 depicts, after converting the first solid state drive, re-mapping the first solid state drive, wherein the re-mapping comprises making the first solid state drive accessible for reads and writes of second data. That is, the first solid state drive can be put back into service for data storage.

After operation 512, process flow 400 moves to operation 414.

Operation 414 depicts storing the second data to the first solid state drive. That is, the first solid state drive can be used for data storage.

After operation 414, process flow 400 moves to 416, where process flow 400 ends.

Figure 5:
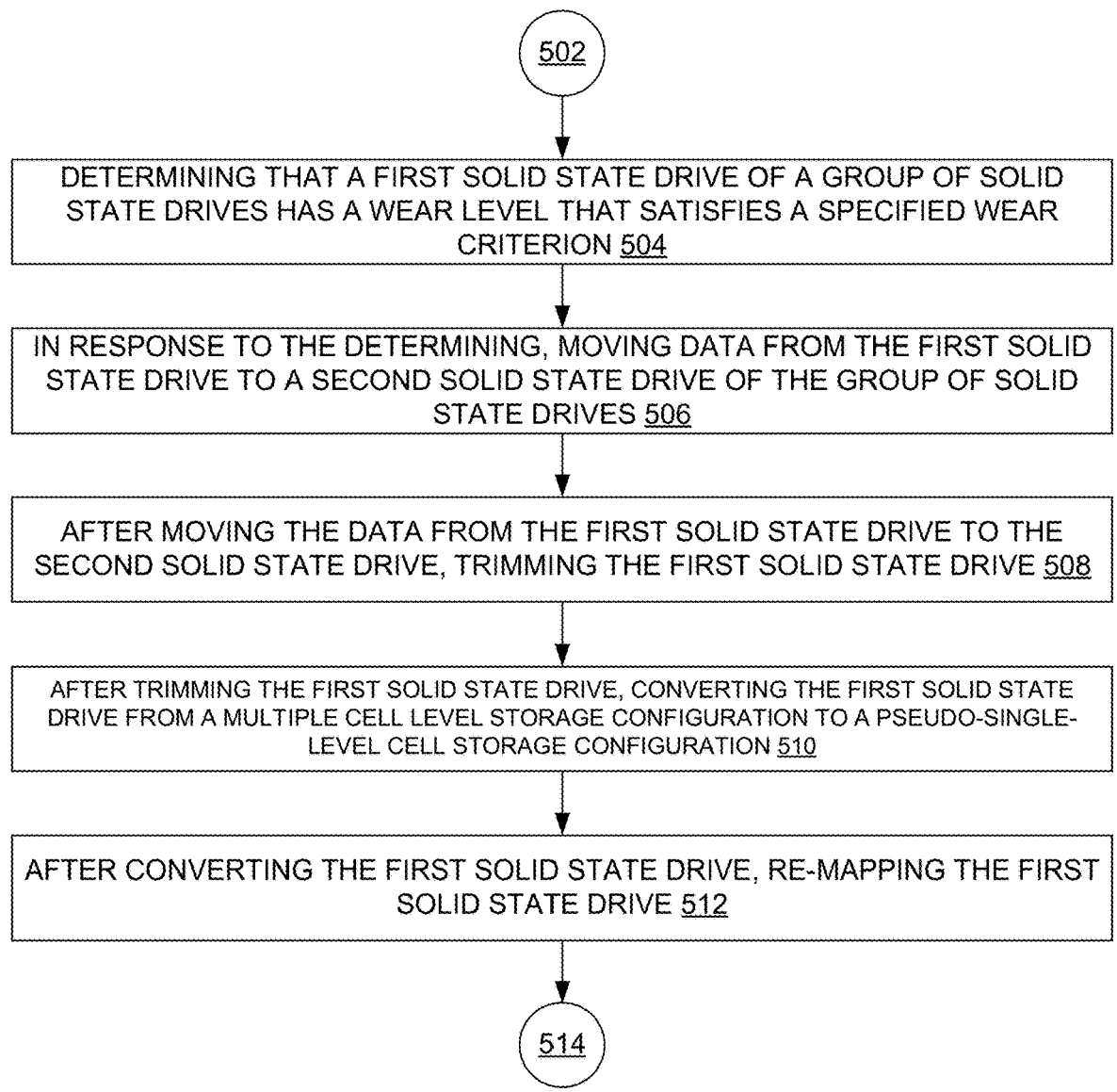
FIG. 5 illustrates another example process flow that can facilitate a sustainable storage system, in accordance with an embodiment of this disclosure.

FIG. 5 illustrates an example process flow 500 that can facilitate a sustainable storage system, in accordance with an embodiment of this disclosure. In some examples, one or more embodiments of process flow 500 can be implemented by sustainable storage system component 108 of FIG. 1, or computing environment 1000 of FIG. 10.

It can be appreciated that the operating procedures of process flow 500 are example operating procedures, and that there can be embodiments that implement more or fewer operating procedures than are depicted, or that implement the depicted operating procedures in a different order than as depicted. In some examples, process flow 500 can be implemented in conjunction with one or more embodiments of one or more of process flow 400 of FIG. 4, process flow 600 of FIG. 6, process flow 700 of FIG. 7, process flow 800 of FIG. 8, and/or process flow 900 of FIG. 9.

Process flow 500 begins with 502, and moves to operation 504.

Operation 504 depicts determining that a first solid state drive of a group of solid state drives has a wear level that satisfies a specified wear criterion. In some examples, operation 504 can be implemented in a similar manner as operation 404 of FIG. 4.

In some examples, operation 504 comprises determining that configuration data associated with a user account for which the data is stored on the first solid state drive indicates an agreement to converting the first solid state drive to the pseudo-single-level cell storage configuration. That is, the present techniques can be performed where a user of the drive has indicated that it is willing to expand a lifespan of the drive at an expense of capacity.

In some examples, operation 504 comprises determining a warranty of the first solid state drive has expired before converting the first solid state drive to the pseudo-single-level cell storage configuration. That is, the present techniques can be performed where a warranty of the drive has expired.

After operation 504, process flow 500 moves to operation 506.

Operation 506 depicts, in response to the determining, moving data from the first solid state drive to a second solid state drive of the group of solid state drives. In some examples, operation 506 can be implemented in a similar manner as operation 406 of FIG. 4.

After operation 506, process flow 500 moves to operation 508.

Operation 508 depicts, after moving the data from the first solid state drive to the second solid state drive, trimming the first solid state drive. In some examples, operation 508 can be implemented in a similar manner as operation 408 of FIG. 4.

After operation 508, process flow 500 moves to operation 510.

Operation 510 depicts, after trimming the first solid state drive, converting the first solid state drive from a multiple cell level storage configuration to a pseudo-single-level cell storage configuration. In some examples, operation 510 can be implemented in a similar manner as operation 410 of FIG. 4.

In some examples, a first storage capacity of the first solid state drive in the multiple cell level storage configuration is greater than a second storage capacity of the first solid state drive in the pseudo-single-level cell storage configuration. In some examples, a first projected lifespan of the first solid state drive in the multiple cell level storage configuration is less than a second projected lifespan of the first solid state drive in the pseudo-single-level cell storage configuration. In some examples, a first power consumption level associated with operating the first solid state drive in the multiple cell level storage configuration is greater than a second power consumption level associated with operating the first solid state drive in the pseudo-single-level cell storage configuration. That is, an effect of converting a drive to pSLC can be a decrease in the drive's storage capacity, an increase in the drive's projected lifespan, and/or a decrease in the drive's expected power consumption, respectively.

After operation 510, process flow 500 moves to operation 512.

Operation 512 depicts, after converting the first solid state drive, re-mapping the first solid state drive. In some examples, operation 512 can be implemented in a similar manner as operation 412 of FIG. 4.

In some examples, the data is first data, the unmapping comprises making the first data of the first solid state drive inaccessible, and the re-mapping comprises making the first solid state drive accessible for reads and writes of second data.

After operation 512, process flow 500 moves to operation 514, where process flow 500 ends.

FIG. 6 illustrates an example process flow 600 that can facilitate a sustainable storage system, in accordance with an embodiment of this disclosure. In some examples, one or more embodiments of process flow 600 can be implemented by sustainable storage system component 108 of FIG. 1, or computing environment 1000 of FIG. 10.

It can be appreciated that the operating procedures of process flow 600 are example operating procedures, and that there can be embodiments that implement more or fewer operating procedures than are depicted, or that implement the depicted operating procedures in a different order than as depicted. In some examples, process flow 600 can be implemented in conjunction with one or more embodiments of one or more of process flow 400 of FIG. 4, process flow 500 of FIG. 5, process flow 700 of FIG. 7, process flow 800 of FIG. 8, and/or process flow 900 of FIG. 9.

Process flow 600 begins with 602, and moves to operation 604.

Operation 604 depicts determining to convert a first solid state drive from a first configuration of a first number of levels per cell to a second configuration of a second number of levels per cell, wherein the first number of levels per cell is greater than the second number of levels per cell. In some examples, operation 604 can be implemented in a similar manner as operation 404 of FIG. 4.

In some examples, determining to convert the first solid state drive from the first configuration of the first number of levels per cell to the second configuration of the second number of levels per cell comprises determining that the first solid state drive has a wear level between approximately 85% and approximately 95%.

In some examples, determining to convert the first solid state drive from the first configuration of the first number of levels per cell to the second configuration of the second number of levels per cell comprises determining that configuration data associated with a user account for which the data is stored on the first solid state drive indicates assenting to converting the first solid state drive to the second configuration.

In some examples, determining to convert the first solid state drive from the first configuration of the first number of levels per cell to the second configuration of the second number of levels per cell comprises determining that a warranty of the first solid state drive has expired before converting the first solid state drive to the second configuration.

In some examples, the first solid state drive comprises a device that is configured to persistently store computer data with a group of integrated circuit assemblies. That is, a solid state drive can be distinguished from other storage drive technologies, such as those that incorporate spinning magnetic disks.

After operation 604, process flow 600 moves to operation 606.

Operation 606 depicts, in response to the determining, moving data from the first solid state drive to a second storage device. In some examples, operation 606 can be implemented in a similar manner as operation 406 of FIG. 4.

After operation 606, process flow 600 moves to operation 608.

Operation 608 depicts, after moving the data from the first solid state drive to the second storage device, unmapping the first solid state drive. In some examples, operation 608 can be implemented in a similar manner as operation 408 of FIG. 4.

After operation 608, process flow 600 moves to operation 610.

Operation 610 depicts, after unmapping the first solid state drive, converting the first solid state drive from the first number of levels per cell to the second number of levels per cell.

In some examples, the first number of levels per cell comprises multiple levels, and wherein the second number of levels per cell comprises a pseudo-single-level cell configuration. That is, the first number of levels per cell can be, for example, a TLC or QLC configuration.

After operation 610, process flow 600 moves to operation 612.

Operation 612 depicts, after converting the first solid state drive, re-mapping the first solid state drive.

After operation 612, process flow 600 moves to 614, where process flow 600 ends.

Figure 7:
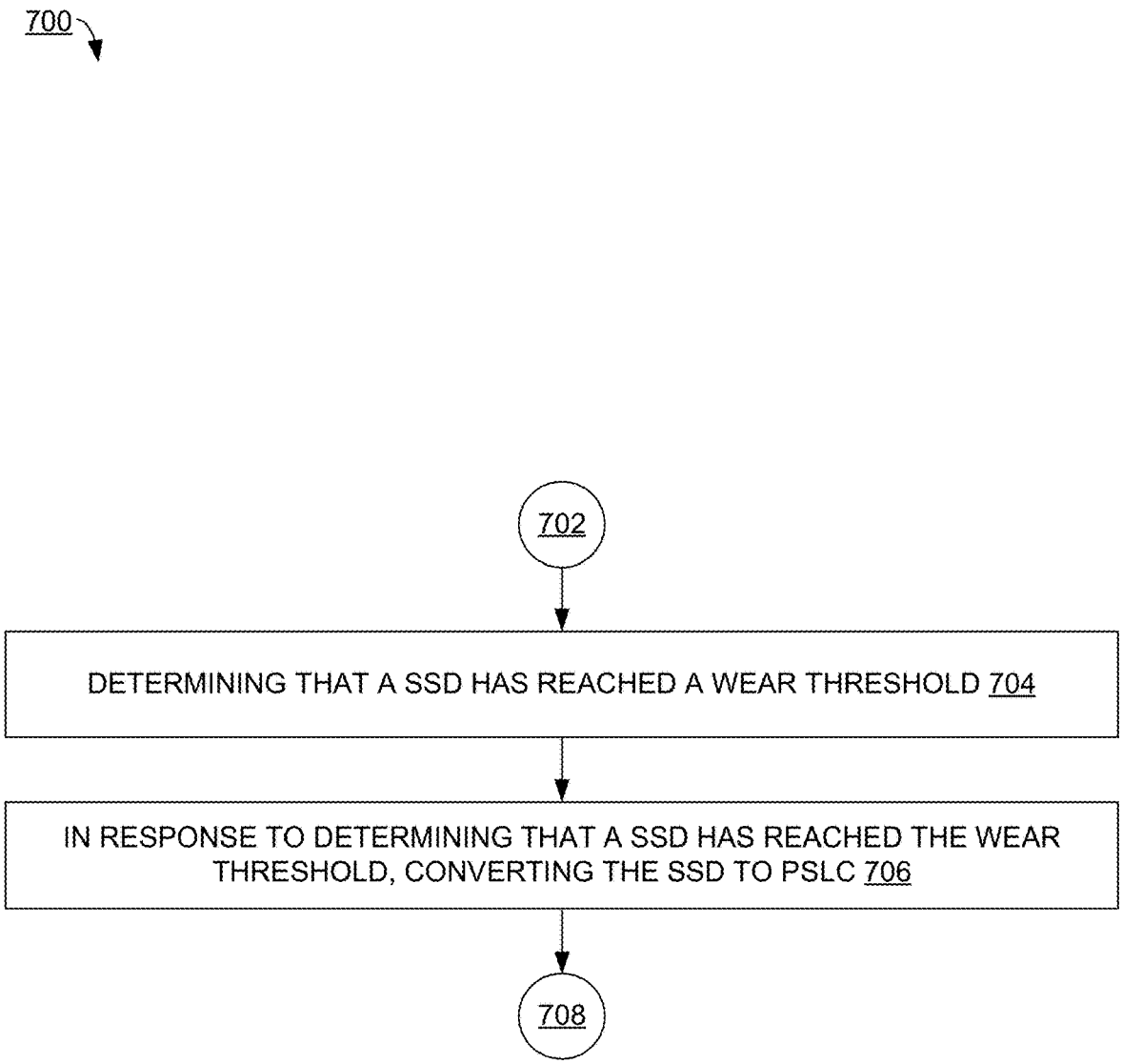
FIG. 7 illustrates another example process flow that can facilitate a sustainable storage system, in accordance with an embodiment of this disclosure.

FIG. 7 illustrates an example process flow 700 that can facilitate a sustainable storage system, in accordance with an embodiment of this disclosure. In some examples, one or more embodiments of process flow 700 can be implemented by sustainable storage system component 108 of FIG. 1, or computing environment 1000 of FIG. 10.

It can be appreciated that the operating procedures of process flow 700 are example operating procedures, and that there can be embodiments that implement more or fewer operating procedures than are depicted, or that implement the depicted operating procedures in a different order than as depicted. In some examples, process flow 700 can be implemented in conjunction with one or more embodiments of one or more of process flow 400 of FIG. 4, process flow 500 of FIG. 5, process flow 600 of FIG. 6, process flow 800 of FIG. 8, and/or process flow 900 of FIG. 9.

Process flow 700 begins with 702, and moves to operation 704.

Operation 704 depicts determining that an SSD has reached a wear threshold. Using the example of FIG. 1, this can comprise sustainable storage system component 108 periodically querying the respective SSDs of SSDs 110 for their respective wear levels. Where an SSD has a wear level above a predetermined threshold (e.g., 85%), it can be determined that the SSD has reached the wear threshold.

After operation 704, process flow 700 moves to operation 706.

Operation 706 depicts, in response to determining that an SSD has reached the wear threshold, converting the SSD to pSLC. Converting the SSD to pSLC can be performed by unmapping the SSD, moving data from the SSD to another SSD, converting the SSD to pSLC, and remapping the SSD.

After operation 706, process flow 700 moves to 708, where process flow 700 ends.

FIG. 8 illustrates an example process flow 800 that can facilitate a sustainable storage system, in accordance with an embodiment of this disclosure. In some examples, one or more embodiments of process flow 800 can be implemented by sustainable storage system component 108 of FIG. 1, or computing environment 1000 of FIG. 10.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of one or more of process flow 400 of FIG. 4, process flow 500 of FIG. 5, process flow 600 of FIG. 6, process flow 700 of FIG. 7, and/or process flow 900 of FIG. 9.

Process flow 800 begins with 802, and moves to operation 804.

Operation 804 depicts determining that an SSD is out of warranty. Using the example of FIG. 1, this can comprise sustainable storage system component 108 maintaining respective warranty information (e.g., a date at which a warranty ends) for the respective SSDs of SSDs 110. Sustainable storage system component 108 can periodically check these warranty expiration dates, and where sustainable storage system component 108 determines that a particular SSD's warranty has expired, this can comprise determining that the SSD is out of warranty.

After operation 804, process flow 800 moves to operation 806.

Operation 806 depicts, in response to determining that an SSD is out of warranty, converting the SSD to pSLC. This can be performed in a similar manner as operation 706 of FIG. 7.

After operation 806, process flow 800 moves to 808, where process flow 800 ends.

FIG. 9 illustrates an example process flow 900 that can facilitate a sustainable storage system, in accordance with an embodiment of this disclosure. In some examples, one or more embodiments of process flow 900 can be implemented by sustainable storage system component 108 of FIG. 1, or computing environment 1000 of FIG. 10.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of process flow 400 of FIG. 4, process flow 500 of FIG. 5, process flow 600 of FIG. 6, process flow 700 of FIG. 7, and/or process flow 800 of FIG. 8.

Process flow 900 begins with 902, and moves to operation 904.

Operation 904 depicts determining that a user has opted-in to a sustainable storage system. Using the example of FIG. 1, this can comprise sustainable storage system component 108 receiving user input data indicative of a user account opting in to implementing the present techniques with one or more SSDs maintained for the user account. In some examples where storage system 102 stores data for multiple user accounts on different drives (e.g., data for user account A is stored on a first group of drives, and data for user account B is stored on a second group of drives), this can comprise sustainable storage system component 108 maintaining an association between particular user accounts and particular drives on which data for those user accounts are stored.

After operation 904, process flow 900 moves to operation 906.

Operation 906 depicts, in response to determining that the user has opted-in to a sustainable storage system, converting the SSD to pSLC. This can be performed in a similar manner as operation 706 of FIG. 7.

After operation 906, process flow 900 moves to 908, where process flow 900 ends.

In some examples, more than one of the process flows of FIGS. 7-9 can be implemented together. For example, all of the process flows of FIGS. 7-9 can be implemented together so that a storage drive's cell-level configuration can be changed when a drive reaches a certain wear level, when the drive is out of warranty, and when a user opts-in.

Example Operating Environment

In order to provide additional context for various embodiments described herein, FIG. 10 and the following discussion are intended to provide a brief, general description of a suitable computing environment 1000 in which the various embodiments of the embodiment described herein can be implemented.

For example, parts of computing environment 1000 can be used to implement one or more embodiments of storage system 102 and/or remote computer 106 of FIG. 1.

In some examples, computing environment 1000 can implement one or more embodiments of the process flows of FIGS. 4-9 to facilitate a sustainable storage system.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a nonvolatile storage such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/ wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/ storage device 1052. It will be appreciated that the network connections shown are examples, and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it is employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
at least one processor; and
at least one memory that stores executable instructions that, when executed by the at least one processor, performs operations, comprising:
performing a first determining that a first solid state drive of a group of solid state drives maintained by the system has a wear level that satisfies a defined wear criterion, wherein the wear level indicates an average number of program/erase cycles that have been performed on all storage cells of the first solid state drive;
performing a second determining that configuration data associated with a user account for which data is stored on the first solid state drive indicates an agreement to converting the first solid state drive to the pseudo-single-level cell storage configuration, based on a stored association between respective user accounts of a group of user accounts and respective solid state drives of the group of solid state drives that store data of the respective user accounts, wherein the group of solid state drives stores data for a group of users that comprises the user account;
in response to the first determining and to the second determining, moving first data from the first solid state drive to a second solid state drive of the group of solid state drives;
after moving the first data from the first solid state drive to the second solid state drive, unmapping the first solid state drive, wherein the unmapping comprises making the first data of the first solid state drive inaccessible via the first solid state drive;
after unmapping the first solid state drive, converting the first solid state drive from a configuration having a number of cell levels to a pseudo-single-level cell storage configuration, wherein the configuration having the number of cell levels comprises a multiple-level cell storage configuration;
after converting the first solid state drive, re-mapping the first solid state drive, wherein the re-mapping comprises making the first solid state drive accessible for reads and writes of second data; and
storing the second data to the first solid state drive.

2. The system of claim 1, wherein converting the first solid state drive from the number of cell levels to the pseudo-single-level cell storage configuration comprises converting via a firmware solid state drive application programming interface call.

3. The system of claim 1, wherein the pseudo-single-level cell storage configuration comprises a cell of the first solid state drive that was configured to store multiple bits of data being re-configured to store one bit of data.

4. The system of claim 1, wherein the pseudo-single-level cell storage configuration comprises an identification of a cell of the first solid state drive with a Boolean value.

5. The system of claim 4, wherein the Boolean value indicates an erased state or a programmed state.

6. The system of claim 1, wherein the number of cell levels comprises a triple-layer cell configuration, and wherein three bits are written to a cell of the first solid state drive.

7. The system of claim 1, wherein the number of cell levels comprises a quad-layer cell configuration, and wherein four bits are written to a cell of the first solid state drive.

8. The system of claim 1, wherein the operations further comprise:
determining that a warranty of the first solid state drive has expired before converting the first solid state drive to the pseudo-single-level cell storage configuration.

9. The system of claim 1, wherein the wear criterion indicates that the first solid state drive has a wear level of at least 85%.

10. A method, comprising:
performing a first determining, by a system comprising at least one processor, that a first solid state drive of a group of solid state drives has a wear level that satisfies a specified wear criterion, wherein the specified wear criterion level indicates an average number of program/erase cycles that have been performed on the first solid state drive;
performing a second determining, by the system, that configuration data associated with a user account for which data is stored on the first solid state drive indicates an agreement to converting the first solid state drive to the pseudo-single-level cell storage configuration, based on a stored association between respective user accounts of a group of user accounts and respective solid state drives of the group of solid state drives that store data of the respective user accounts, wherein the group of solid state drives stores data for a group of users that comprises the user account;
in response to the first determining and to the second determining, moving, by the system, data from the first solid state drive to a second solid state drive of the group of solid state drives;
after moving the data from the first solid state drive to the second solid state drive, trimming, by the system, the first solid state drive;
after trimming the first solid state drive, converting, by the system, the first solid state drive from a multiple cell level storage configuration to a pseudo-single-level cell storage configuration; and
after converting the first solid state drive, re-mapping, by the system, the first solid state drive.

11. The method of claim 10, further comprising:
determining, by the system, that a warranty of the first solid state drive has expired before converting the first solid state drive to the pseudo-single-level cell storage configuration.

12. The method of claim 10, wherein a first storage capacity of the first solid state drive in the multiple cell level storage configuration is greater than a second storage capacity of the first solid state drive in the pseudo-single-level cell storage configuration.

13. The method of claim 10, wherein a first projected lifespan of the first solid state drive in the multiple cell level storage configuration is less than a second projected lifespan of the first solid state drive in the pseudo-single-level cell storage configuration.

14. The method of claim 10, wherein a first power consumption level associated with operating the first solid state drive in the multiple cell level storage configuration is greater than a second power consumption level associated with operating the first solid state drive in the pseudo-single-level cell storage configuration.

15. The method of claim 10, wherein the data is first data, wherein the unmapping comprises making the first data of the first solid state drive inaccessible, and wherein the re-mapping comprises making the first solid state drive accessible for reads and writes of second data.

16. A non-transitory computer-readable medium comprising instructions that, in response to execution, cause a system comprising at least one processor to perform operations, comprising:
determining to convert a first solid state drive from a first configuration of a first number of levels per cell to a second configuration of a second number of levels per cell based on:
determining that an average number of program/erase cycles that have been performed on the first solid state drive satisfies a wear criterion, wherein the first number of levels per cell is greater than the second number of levels per cell, and
determining that configuration data associated with a user account for which data is stored on the first solid state drive indicates an agreement to converting the first solid state drive to the pseudo-single-level cell storage configuration, based on a stored association between respective user accounts of a group of user accounts and respective solid state drives of the group of solid state drives that store data of the respective user accounts, wherein the group of solid state drives stores data for a group of users that comprises the user account;
in response to the determining to convert the first solid state drive, moving data from the first solid state drive to a second storage device;
after moving the data from the first solid state drive to the second storage device, unmapping the first solid state drive;
after unmapping the first solid state drive, converting the first solid state drive from the first number of levels per cell to the second number of levels per cell; and
after converting the first solid state drive, re-mapping the first solid state drive.

17. The non-transitory computer-readable medium of claim 16, wherein the first number of levels per cell comprises multiple levels, and wherein the second number of levels per cell comprises a pseudo-single-level cell configuration.

18. The non-transitory computer-readable medium of claim 16, wherein the wear criterion indicates that the first solid state drive has a wear level of at least 85%.

19. The non-transitory computer-readable medium of claim 16, wherein determining to convert the first solid state drive from the first configuration of the first number of levels per cell to the second configuration of the second number of levels per cell comprises:

determining that a warranty of the first solid state drive has expired before converting the first solid state drive to the second configuration.

20. The non-transitory computer-readable medium of claim 16, wherein the first solid state drive comprises a device that is configured to persistently store computer data with a group of integrated circuit assemblies.

\* \* \* \* \*